(12) United States Patent
Terakado et al.

(10) Patent No.: US 6,246,441 B1
(45) Date of Patent: Jun. 12, 2001

(54) CONTROL DEVICE, CONTROL METHOD, ELECTRIC APPARATUS, CONTROL METHOD OF AN ELECTRIC APPARATUS, ELECTRIC APPARATUS SYSTEM, CONTROL METHOD OF AN ELECTRIC APPARATUS SYSTEM, AND TRANSMISSION MEDIUM

(75) Inventors: Tomoko Terakado; Yukio Furudate; Tomoyuki Hanai; Tatsushi Nashida, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/114,390

(22) Filed: Jul. 13, 1998

(30) Foreign Application Priority Data

Jul. 18, 1997 (JP) .................................................. 9-193588

(51) Int. Cl.⁷ ...................................................... H04N 5/44
(52) U.S. Cl. .......................... 348/552; 348/725; 348/731; 348/570; 348/553; 348/10; 386/46
(58) Field of Search ..................................... 348/416, 552, 348/574, 461, 722, 10, 8, 9, 564, 569, 906, 735, 725, 731, 553, 570, 13, 734; 386/46, 83; 710/102, 106; 345/327; H04N 5/44

(56) References Cited

U.S. PATENT DOCUMENTS

| | | | |
|---|---|---|---|
| 5,635,978 | * 6/1997 | Alten et al. | 348/7 |
| 5,737,029 | * 4/1998 | Ohkura | 348/569 |
| 5,801,787 | * 9/1998 | Schein | 348/589 |
| 5,848,352 | * 12/1998 | Dougherty | 348/12 |
| 5,867,226 | * 2/1999 | Wehmeyer | 348/10 |
| 5,886,691 | * 3/1999 | Furuya | 348/2 |
| 5,886,995 | * 3/1999 | Arsenault | 348/6 |
| 5,900,905 | * 5/1999 | Shoff | 348/12 |
| 5,903,314 | * 5/1999 | Niijima | 348/565 |
| 5,907,323 | * 3/1999 | Lawler | 348/7 |
| 5,926,179 | 7/1999 | Matsuda et al. | 345/355 |
| 5,926,230 | * 6/1999 | Niijima | 348/565 |
| 5,931,908 | * 8/1999 | Gerba | 348/7 |
| 6,005,562 | * 12/1999 | Shiga | 348/327 |
| 6,057,856 | 5/2000 | Miyashita et al. | 345/435 |
| 6,084,643 | * 7/2000 | Kishtaka | 348/725 |

* cited by examiner

Primary Examiner—Matthew Luu
Assistant Examiner—Wesner Sajous
(74) Attorney, Agent, or Firm—Oblon, Spivak, McClelland, Maier & Neustadt, P.C.

(57) ABSTRACT

Radio waves transmitted from the antenna of a broadcasting station are received by the antenna of a television receiver. The television receiver extracts an EPG from the received radio waves and transmits it to a remote controller via an infrared transmission/reception section. The remote controller displays the received EPG on an LCD and is then rendered in a state of waiting for selection of a program. If some program is selected and then a reserve button is manipulated, the remote controller transmits a control command for a recording reservation to a video tape recorder. The video tape recorder receives the control command with an infrared transmission/reception section, whereby the recording reservation of the designated program is set.

4 Claims, 14 Drawing Sheets

FIG.9

FUTURE BROADCAST PROGRAMS (10ch)

6:00~6:30    ABB News

6:30~7:00    Be Disgraced in Quiz Show

7:00~8:00    TV Scramble

8:00~9:00    Monico Grand Prix

9:00~10:00   Creation of All Things

10:00~11:30  News Station Eyes

11:30~12:00  Conductors in the World

FIG.11

Selected Program : News Station Eyes

Broadcast Start Time : 10:00

Broadcast End Time : 11:30

Anchor Men : Tetsuya Kume
　　　　　　　Etsuo Komiya

Contents : Up-to-the-minute Reports of
　　　　　　Election Returns

Preventive Measures against O158

Does Life Exist on Mars?

FIG.13

COMMERCIAL (TONY DIGITAL STILL CAMERA)

Product Name : DSC-100

Features :

①Business Card Size

②One Million Pixels

③Capable of Taking 1,000 Pictures at the Maximum

④Also Capable of Sound Recording

Price    ¥39,800

Now, 10%-Discount Is Available with Coupon!

URL : www.tony.com

CONTROL DEVICE, CONTROL METHOD, ELECTRIC APPARATUS, CONTROL METHOD OF AN ELECTRIC APPARATUS, ELECTRIC APPARATUS SYSTEM, CONTROL METHOD OF AN ELECTRIC APPARATUS SYSTEM, AND TRANSMISSION MEDIUM

FIELD OF THE INVENTION

The present invention relates to a control device, a control method, an electric apparatus, a control method of an electric apparatus, an electric apparatus system, a control method of an electric apparatus system, and a transmission medium, and, more specifically, to those of a kind in which information to which additional information is added is exchanged.

BACKGROUND OF THE INVENTION

Conventionally, in recording a desired program with a VTR (video tape recorder), it is necessary to input, through a manipulating section of the VTR, a broadcast start time and end time and a broadcast channel number of the intended program by, for instance, referring to a program page of a newspaper, a magazine, or the like.

Further, to store useful information included in an advertisement (commercial) message or the like that is received by a television receiver, it is necessary for a user to make notes on a sheet or the like.

In each of the above cases, the user needs to temporarily memorize necessary information and then make inputs through the manipulating section of the VTR or make notes on a sheet or the like. This causes problems that he may inadvertently input erroneous information and that he may forget useful information.

SUMMARY OF THE INVENTION

The present invention has been made in view of the above circumstances in the art, and an object of the present invention is therefore to make it possible to control an electric apparatus such as a VTR or a television receiver or to record useful information without requiring a user to temporarily memorize information.

According to a first aspect of the invention, there is provided a control device which controls, by transmitting a control signal to it, an electric apparatus that receives information transmitted via a transmission medium, comprising transmitting means for transmitting the control signal to the electric apparatus; receiving means for receiving additional information that has been extracted from the received information and transmitted by the electric apparatus; and output means for outputting the additional information received by the receiving means to a display device.

There is provided a control method for controlling, by transmitting a control signal to it, an electric apparatus that receives information transmitted via a transmission medium, comprising a transmitting step of transmitting the control signal to the electric apparatus; a receiving step of receiving additional information that has been extracted from the received information and transmitted by the electric apparatus; and an output step of outputting the additional information received in the receiving step to a display device.

There is provided a transmission medium for transmitting a computer program that is used in a control device which controls, by transmitting a control signal to it, an electric apparatus that receives information transmitted via a transmission medium, the computer program comprising a transmitting step of transmitting the control signal to the electric apparatus; a receiving step of receiving additional information that has been extracted from the received information and transmitted by the electric apparatus; and an output step of outputting the additional information received in the receiving step to a display device.

According to a second aspect of the invention, there is provided an electric apparatus which receives information that is transmitted via a transmission medium and performs an operation in accordance with a control signal that is transmitted from a control device, comprising first receiving means for receiving the control signal transmitted from the control device; control means for performing a control in accordance with the control signal received by the first receiving means; second receiving means for receiving the information transmitted via the transmission medium; extracting means for extracting additional information from the information received by the second receiving means; and transmitting means for transmitting the additional information extracted by the extracting means to the control device.

There is provided a control method of an electric apparatus which receives information that is transmitted via a transmission medium and performs an operation in accordance with a control signal that is transmitted from a control device, comprising a first receiving step of receiving the control signal transmitted from the control device; a control step of performing a control in accordance with the control signal received in the first receiving step; a second receiving step of receiving the information transmitted via the transmission medium; an extracting step of extracting additional information from the information received in the second receiving step; and a transmitting step of transmitting the additional information extracted in the extracting step to the control device.

There is provided a transmission medium for transmitting a computer program used in an electric apparatus which receives information that is transmitted via a transmission medium and performs an operation in accordance with a control signal that is transmitted from a control device, the computer program comprising a first receiving step of receiving the control signal transmitted from the control device; a control step of performing a control in accordance with the control signal received in the first receiving step; a second receiving step of receiving the information transmitted via the transmission medium; an extracting step of extracting additional information from the information received in the second receiving step; and a transmitting step of transmitting the additional information extracted in the extracting step to the control device.

According to a third aspect of the invention, there is provided an electric apparatus system comprising an electric apparatus which receives information that is transmitted via a transmission medium and a control device which controls the electric apparatus by transmitting a control signal to the electric apparatus, the electric apparatus comprising first receiving means for receiving the control signal transmitted from the control device; control means for performing a control in accordance with the control signal received by the first receiving means; second receiving means for receiving the information transmitted via the transmission medium; extracting means for extracting additional information from the information received by the second receiving means; and first transmitting means for transmitting the additional information extracted by the extracting means to the control device, the control device comprising second transmitting means for transmitting the control signal to the electric apparatus; third receiving means for receiving the additional information transmitted from the first transmitting means of the electric apparatus; and output means for outputting the additional information received by the third receiving means to a display device.

There is provided a control method of an electric apparatus system comprising an electric apparatus which receives information that is transmitted via a transmission medium and a control device which controls the electric apparatus by transmitting a control signal to the electric apparatus, an electric-apparatus-side part of the control method comprising a first receiving step of receiving the control signal transmitted from the control device; a control step of performing a control in accordance with the control signal received in the first receiving step; a second receiving step of receiving the information transmitted via the transmission medium; an extracting step of extracting additional information from the information received in the second receiving step; and a first transmitting step of transmitting the additional information extracted in the extracting step to the control device, a control-device-side part of the control method comprising a second transmitting step of transmitting the control signal to the electric apparatus; a third receiving step of receiving the additional information transmitted in the first transmitting step of the electric-apparatus-part of the control method; and an output step of outputting the additional information received in the third receiving step to a display device.

There is provided a transmission medium for transmitting a computer program used in an electric apparatus system comprising an electric apparatus which receives information that is transmitted via a transmission medium and a control device which controls the electric apparatus by transmitting a control signal to the electric apparatus, an electric-apparatus-side part of the computer program comprising a first receiving step of receiving the control signal transmitted from the control device; a control step of performing a control in accordance with the control signal received in the first receiving step; a second receiving step of receiving the information transmitted via the transmission medium; an extracting step of extracting additional information from the information received in the second receiving step; and a first transmitting step of transmitting the additional information extracted in the extracting step to the control device, a control-device-side part of the computer program comprising a second transmitting step of transmitting the control signal to the electric apparatus; a third receiving step of receiving the additional information transmitted in the first transmitting step of the electric-apparatus-part of the control method; and an output step of outputting the additional information received in the third receiving step to a display device.

In the above-described control device, control method, and transmission medium according to the first aspect of the invention, a control signal is transmitted to the electric apparatus, additional information that has been extracted from received information and transmitted by the electric apparatus is received, and the received additional information is output to the display device. For example, a control signal that has been input by a user through an input section is transmitted to the electric apparatus. An EPG as additional information that has been extracted from received information and transmitted by the electric apparatus is received. The received additional information is output to an LCD as the display device.

In the above-described electric apparatus, control method of an electric apparatus, and transmission medium according to the second aspect of the invention, a control signal transmitted from the control device is received, a control is performed in accordance with the received control signal, information transmitted via the transmission medium is received, additional information is extracted from the received information, and the extracted additional information is transmitted to the control device. For example, a control signal that has been input by a user and transmitted from the control device is received. The respective sections of the electric apparatus is controlled in accordance with the received control signal. Information such as a television broadcast program transmitted via the transmission medium is received. An EPG as additional information is extracted from the received information. The extracted EPG is transmitted to the control device.

In the above-described electric apparatus system, control method of an electric apparatus system, and transmission medium according to the third aspect of the invention, on the electric apparatus side, a control signal transmitted from the control device is received, a control is performed in accordance with the received control signal, information transmitted via the transmission medium is received, additional information is extracted from the received information, and the extracted additional information is transmitted to the control device. On the control device side, a control signal is transmitted to the electric apparatus, additional information transmitted from the electric apparatus is received, and the received additional information is output to the display device. For example, on the electric apparatus side, a control signal that has been input by a user and transmitted from the control device is received. The respective sections of the electric apparatus is controlled in accordance with the received control signal. Information such as a television broadcast program transmitted via the transmission medium is received. An EPG as additional information is extracted from the received information. The extracted EPG is transmitted to the control device. On the control device side, a control signal that has been input by a user through an input section is transmitted to the electric apparatus. An EPG as additional information transmitted from the electric apparatus is received. The received additional information is output to an LCD as the display device.

BRIEF DESCRIPTION OF THE DRAWINGS

FIG. 9 shows an example of a picture displayed on an LCD If as a result of execution of step S8 shown in FIG. 7.

FIG. 11 is an example of a picture to be displayed on the LCD if as a result of execution of step S 31 shown in FIG. 10.

FIG. 13 shows an example of a picture that is displayed on the LCD 1f as a result of execution of step S53 shown in FIG. 12

DETAILED DESCRIPTION OF THE PREFERRED EMBODIMENTS

Figure 1:
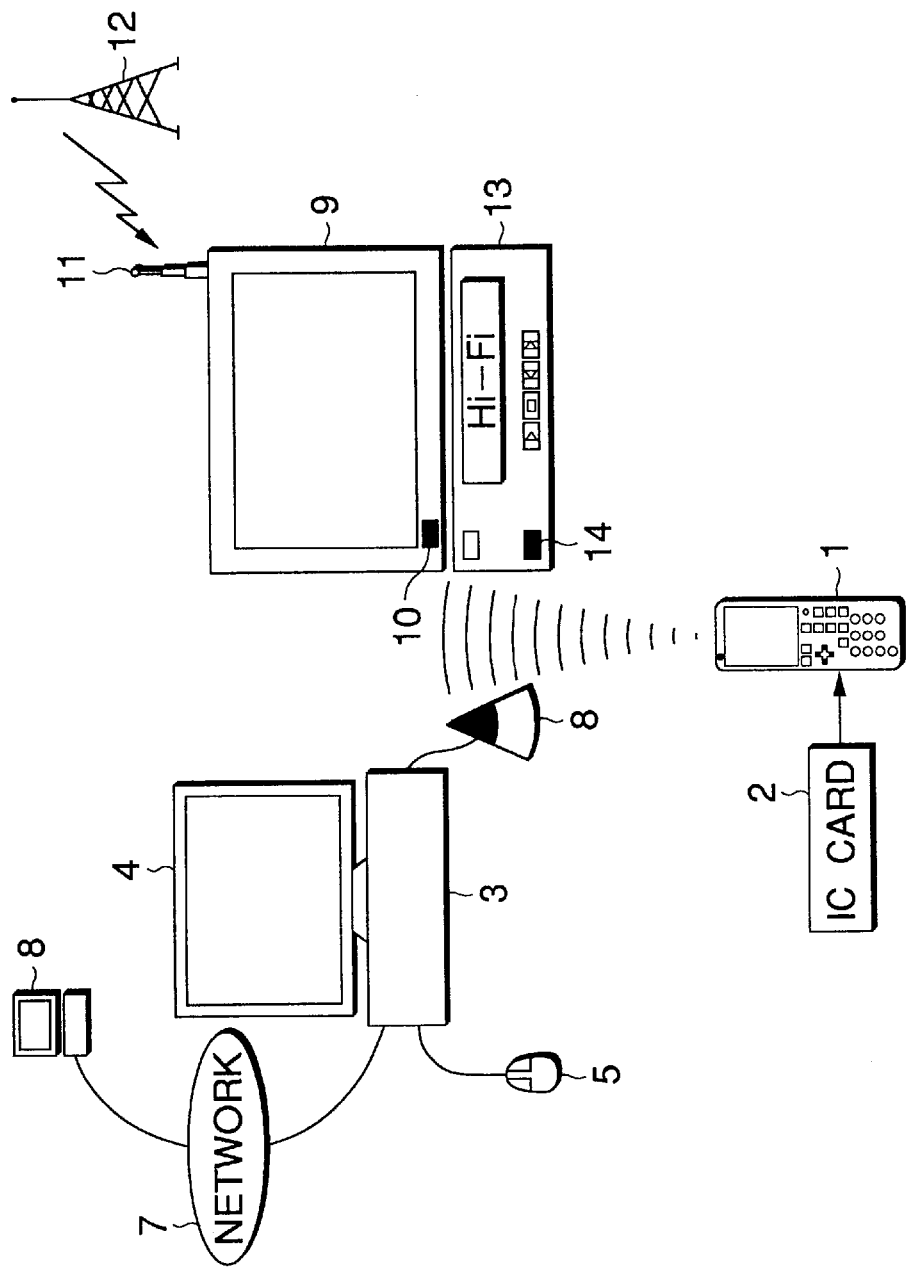
FIG. 1 shows an example configuration of an embodiment according to the present invention.

FIG. 1 is a block diagram showing an example configuration of an embodiment according to the present invention.

In FIG. 1, a remote controller 1 converts a control signal that is input from a manipulating section (described later) into an infrared signal and transmits it to an electric apparatus (personal computer 3, television receiver 9, or VTR 13) as a subject of control. Further, the remote controller 1 receives additional information that is transmitted from the electric apparatus.

An IC card 2 (storing means) is inserted into the remote controller 1, and stores advertisement information such as coupon information when it is supplied.

The personal computer 3 is connected to a server 8 via a network 7 such as the Internet, and exchanges prescribed information with the server 8. A CRT monitor 4 displays information generated by the personal computer 3, information supplied from the server 8 via the network 7, or other information.

A mouse 5 is manipulated by a user when he inputs some information. An infrared transmission/reception section 6 (first receiving means, transmitting means, first transmitting means) transmits/receives a control signal and additional information to/from the remote controller 1 via infrared light.

The television receiver 9 receives, with an antenna 11, radio waves that are transmitted from an antenna 12 of a broadcasting station, extract a signal on a desired channel, and displays it. Further, the television receiver 9 transmits/receives, with an infrared transmission/reception section 10 (first receiving means, transmitting means, first transmitting means), a control signal and additional information to/from the remote controller 1 via infrared light.

The VTR 13 records a video signal that is supplied from the television receiver 9 on a video tape (hereinafter abbreviated as "VT") and reproduces a video signal recorded on the VT. Further, the VTR 13 transmits/receives, with an infrared transmission/reception section 14 (first receiving means, transmitting means, first transmitting means), a control signal and additional information to/from the remote controller 1 via infrared light.

Figure 2:
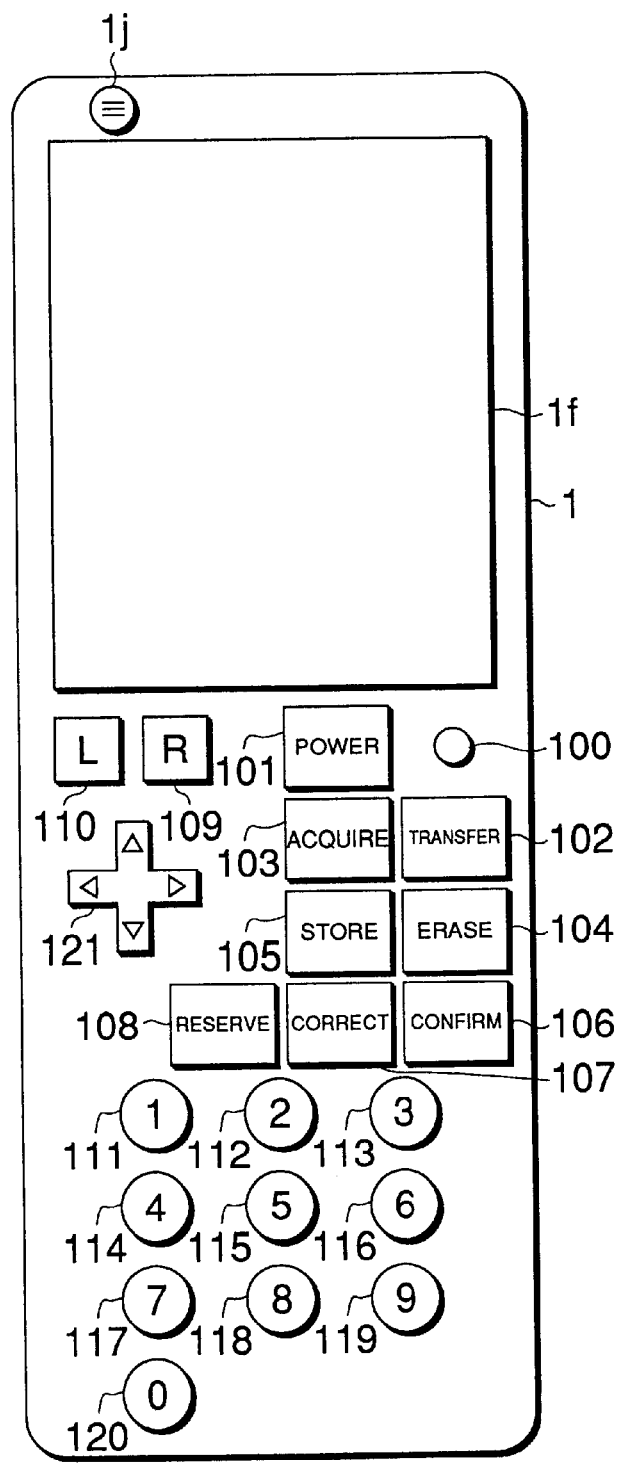
FIG. 2 shows an appearance of a remote controller 1 shown in FIG. 1.

FIG. 2 shows an appearance of the remote controller 1 shown in FIG. 1.

A speaker 1j (notifying means) generates beep sound or the like to call the user's attention. An LCD (liquid crystal display) 1f displays additional information etc. that are transmitted from the personal computer 3 or the television receiver 9.

A LED (light-emitting diode) 100 is turned on when an information communication is made with the electric apparatus, to prevent an event that the user directs the remote controller 1 to a direction that goes off the electric apparatus (personal computer 3, television receiver 9, or VTR 13) during the information communication to disable the communication.

A power button 101 is manipulated to turn on or off the power of the subject electric apparatus by remote control.

A transfer button 102 is manipulated in transferring (transmitting) prescribed information to the electric apparatus. An acquire button 103 is manipulated in acquiring (receiving) desired information that is displayed on the display section of the electric apparatus.

An erase button 104 is manipulated in erasing information that is recorded on the IC card 2. Conversely, the store button 105 is manipulated in recording prescribed information on the IC card 2.

A reserve button 108 is manipulated in making a recording reservation on the VTR 13. A correct button 107 is manipulated in correcting information relating to a recording reservation already made. A confirmation button 106 is manipulated in confirming information relating to a recording reservation already made.

Numeral buttons 111–120 are manipulated in, for example, changing the reception channel of the television receiver 9.

An R-button 109 is manipulated in changing a setting content. An L-button 110 is manipulated to decide about an input command or the like. A cruciform button 121 is manipulated to move the cursor upward, downward, rightward, or leftward.

Figure 3:
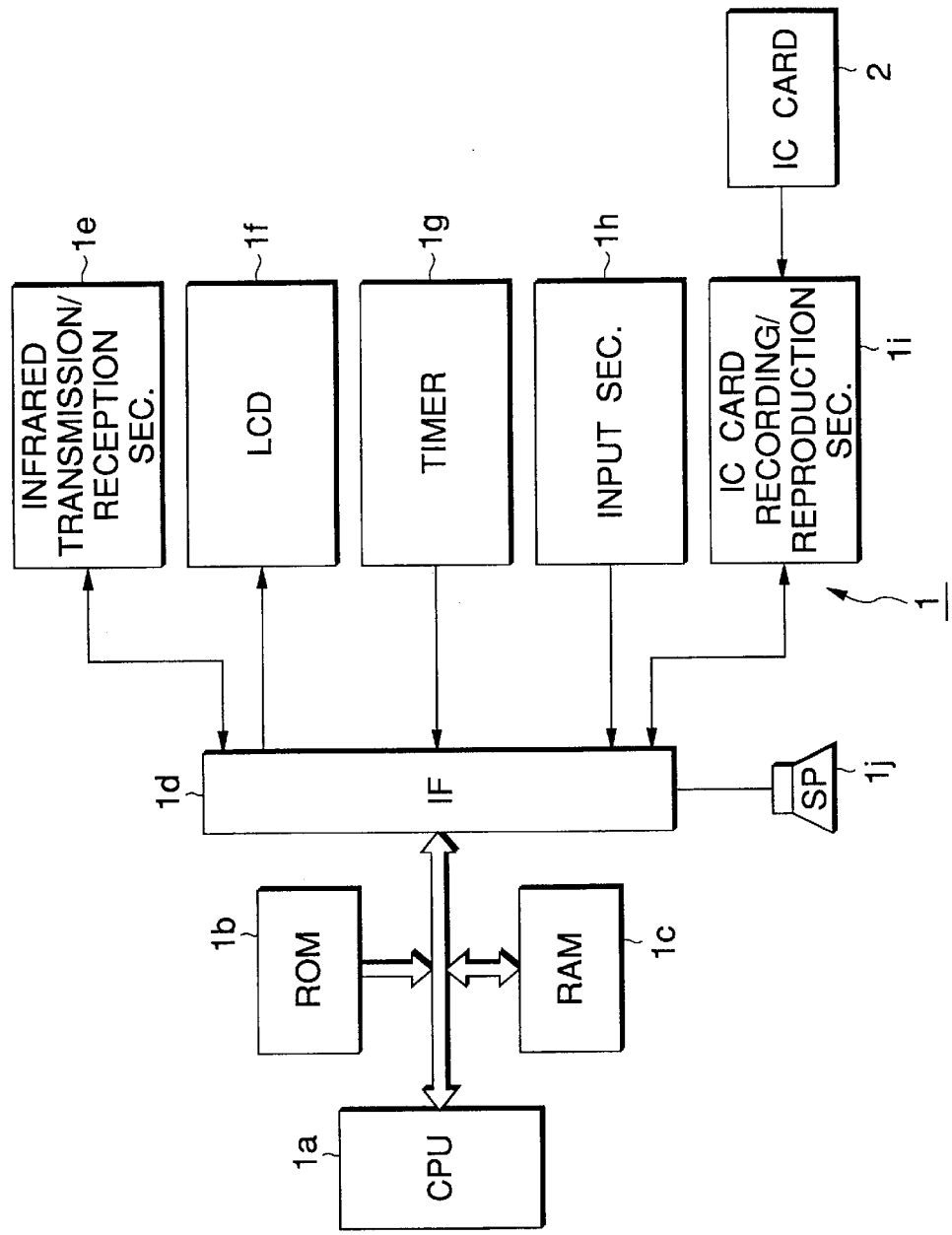
FIG. 3 is a block diagram showing a detailed example configuration of the remote controller 1 shown in FIG. 1.

FIG. 3 is a block diagram showing a detailed example configuration of the remote controller 1 shown in FIG. 1.

In FIG. 3, a CPU 1a controls the respective sections of the device and performs various operations and the like. A ROM 1b stores various programs, data, and the like. A RAM 1c (second storing means) temporarily stores interim data, programs, etc. when the CPU 1a performs various operations.

An interface (IF) 1d (output means) converts data in accordance with the data expression form in each of devices (infrared transmission/reception section 1e etc.) connected thereto to enable a data exchange between the CPU 1a and the device.

The infrared transmission/reception section 1e (transmitting means, receiving means, second transmitting means, third receiving means) exchanges information with the electric apparatus via infrared light. That is, the infrared transmission/reception section 1e transmits infrared light based on data that is supplied from the IF 1d, and also receives infrared light that has been transmitted from the electric apparatus, converts it into a corresponding electrical signal, and outputs it to the CPU 1a via the IF 1d.

The LCD 1f displays an image signal that is supplied from the IF 1d. A timer 1g keeps track of the date and time.

An input section 1h (selecting means, second selecting means) is manipulated when the user inputs a prescribed control command or the like, and is specifically is the manipulation buttons shown in FIG. 2. An IC card recording/reproduction section 1i records information on the IC card 2 and reads out recorded information therefrom.

Figure 4:
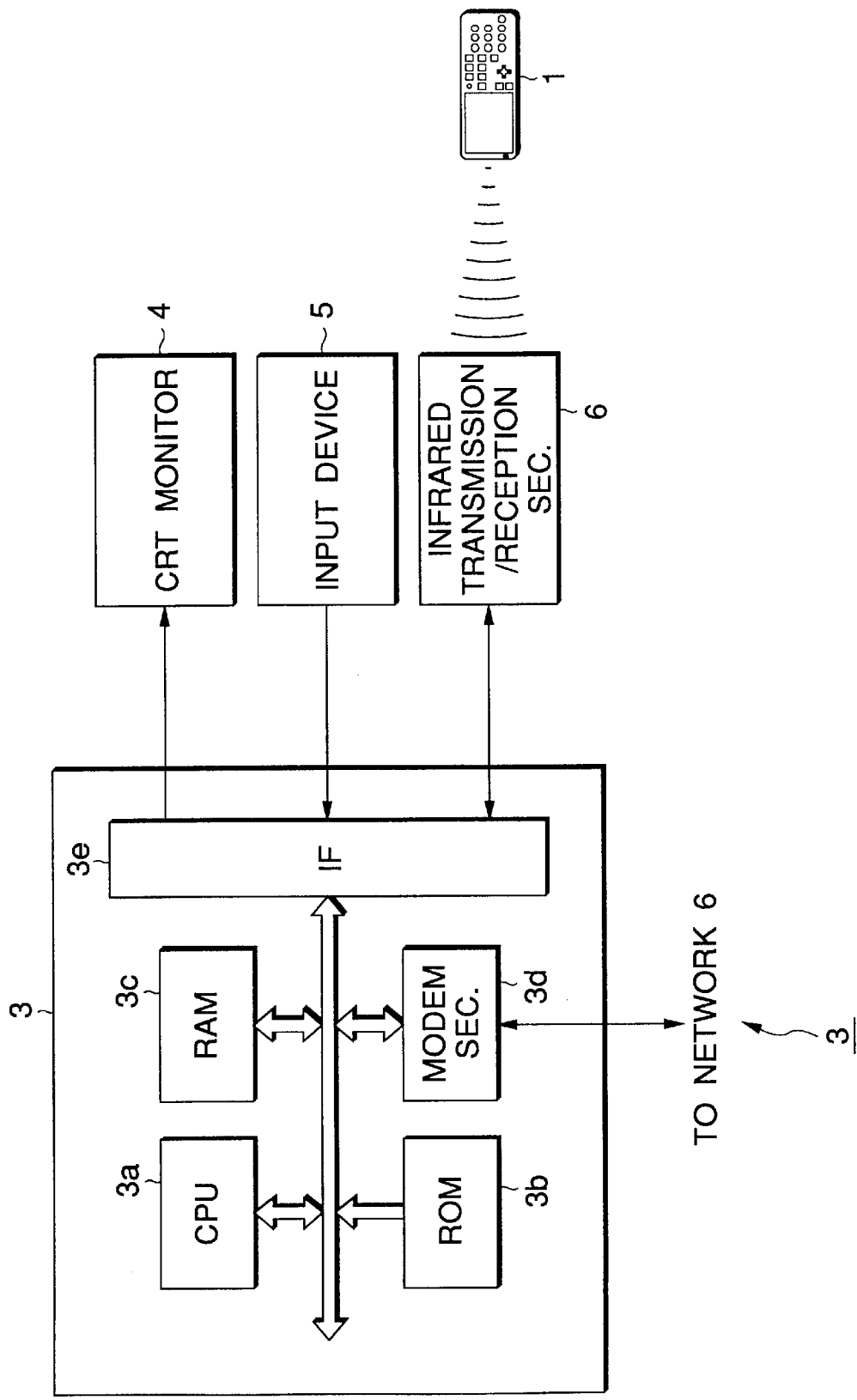
FIG. 4 is a block diagram showing a detailed example configuration of the personal computer 3 shown in FIG. 1.

FIG. 4 is a block diagram showing an example configuration of the personal computer 3 shown in FIG. 1.

In FIG. 4, a CPU 3a (control means, extracting means) controls the respective sections of the apparatus and performs various operations and the like. A ROM 3b stores various programs, data, and the like. A RAM 3c temporarily stores interim data, programs, etc. when the CPU 3a performs various operations.

An interface (IF) 3e converts data in accordance with the data expression format in each of devices (CRT monitor 4, input device 5, and infrared transmission/reception section 6) connected thereto to enable a data exchange between the CPU 3a and the device.

The CRT monitor 4 displays, as an image, RGB signals that are output from the personal computer 3. The input device 5 is, for instance, a mouse (or keyboard) shown in FIG. 1, and is manipulated when the user inputs information.

The infrared transmission/reception section 6 exchanges information with the remote controller 1 via infrared light. That is, the infrared transmission/reception section 6 transmits infrared light based on data that is supplied from the IF 3e, and also receives infrared light that has been transmitted from the remote controller 1, converts it into a corresponding electrical signal, and outputs it to the CPU 3a via the IF 3e.

Figure 5:
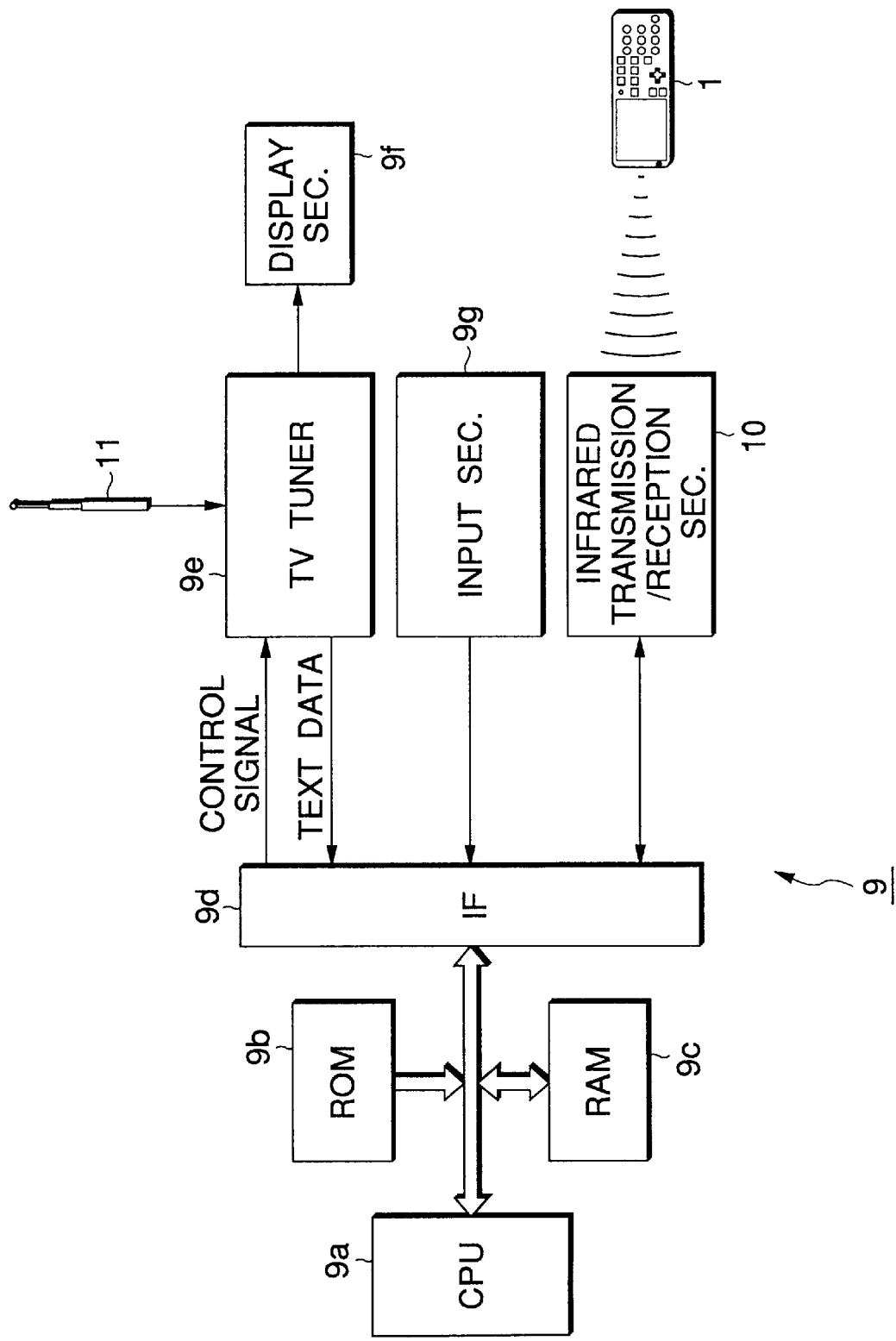
FIG. 5 is a block diagram showing a detailed example configuration of a television receiver 9 shown in FIG. 1.

FIG. 5 is a block diagram showing a detailed example configuration of the television receiver 9 shown in FIG. 1.

In FIG. 5, a CPU 9a (control means, extracting means) controls the respective sections of the apparatus and performs various operations and the like. A ROM 9b stores various programs, data, and the like. A RAM 9c temporarily stores interim data, programs, etc. when the CPU 9a performs various operations.

An interface (IF) 9d converts data in accordance with the data expression format in each of devices (TV tuner 9e, input section 9g, and infrared transmission/reception section 10) connected thereto to enable a data exchange between the CPU 9a and the device.

The TV tuner 9e (second receiving means) extracts a signal of a selected channel from radio waves that has been transmitted from a broadcasting station and received by the antenna 11, and causes a display section (CRT: cathode-ray tube) 9f to display it. Further, the TV tuner 9e extracts an EPG (electronic program guide), advertisement information (including coupon information, a URL, or the like), or such information that is included in broadcast waves, and supplies it to the IF 9d as text data. A reception channel of the TV tuner 9e is selected in accordance with a control signal that is supplied from the CPU 9a via the IF 9d.

The input section 9g is constituted of, for instance, channel selection buttons, volume buttons (not shown), etc., and is manipulated when the user inputs information.

The infrared transmission/reception section 10 exchanges information with the remote controller 1 via infrared light. That is, the infrared transmission/reception section 10 generates and transmits infrared light based on data that is supplied from the IF 9d, and also receives infrared light that has been transmitted from the remote controller 1, converts it into a corresponding electrical signal, and outputs it to the CPU 9a via the IF 9d.

Figure 6:
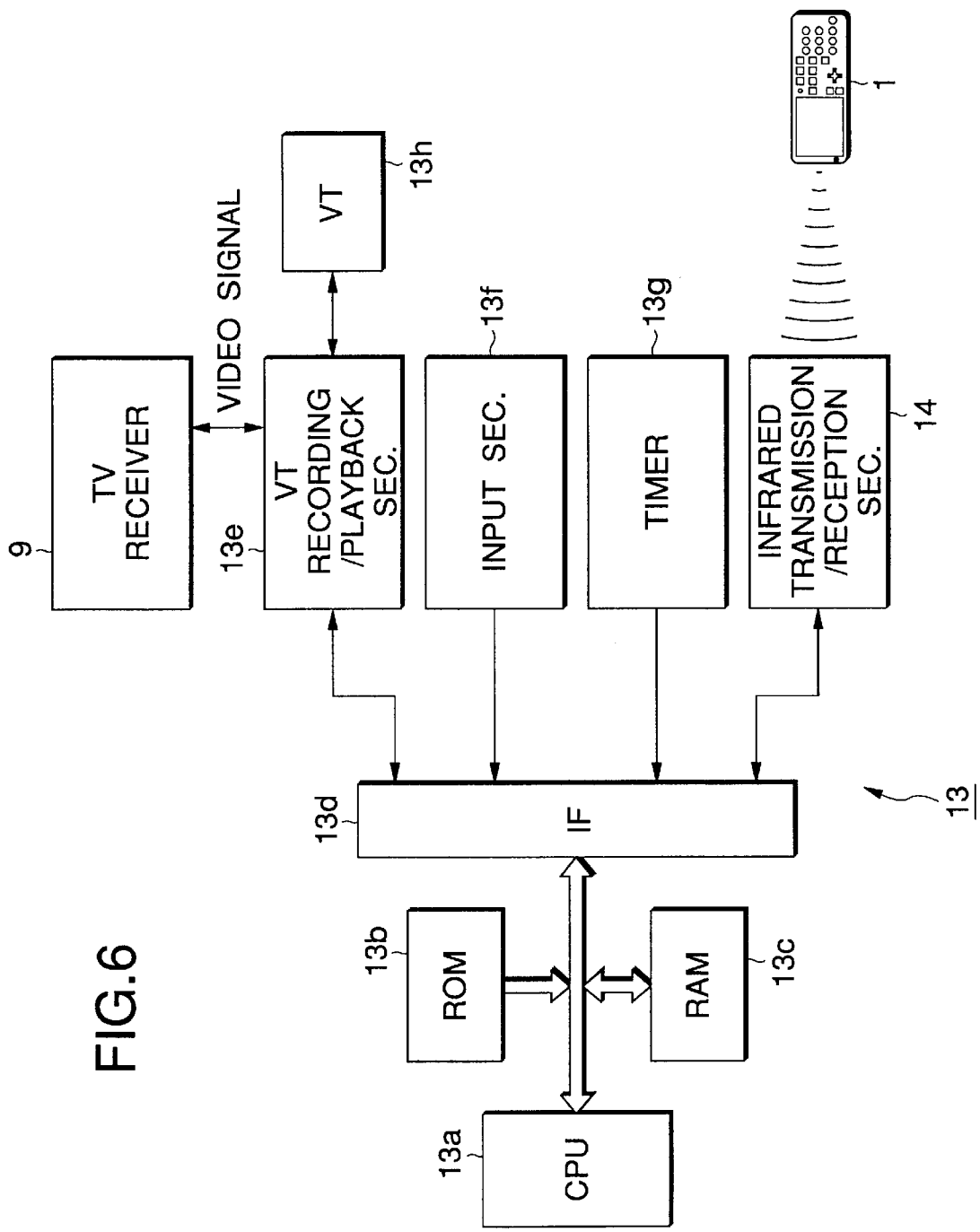
FIG. 6 is a block diagram showing a detailed example configuration of a VTR 13 shown in FIG. 1.

FIG. 6 is a block diagram showing a detailed example configuration of the VTR 13 shown in FIG. 1.

In FIG. 6, a CPU 13a (control means, extracting means) controls the respective sections of the apparatus and performs various operations and the like. A ROM 13b stores various programs, data, and the like. A RAM 13c temporarily stores interim data, programs, etc. when the CPU 13a performs various operations.

An interface (IF) 13d converts data in accordance with the data expression format in each of devices (VT recording/ playback section 13e, input section 13f, timer 13g, and infrared transmission/reception section 14) connected thereto to enable a data exchange between the CPU 13a and the device.

For example, the VT recording/playback section 13e (second receiving means) records a video signal that is supplied from the television receiver 9 on a VT 13h, and also reproduces a video signal that is recorded on the VT 13h and outputs it to the television receiver 9.

The input section 13f is constituted of, for instance, a record button, a playback button, a stop button (not shown), etc., and is manipulated when the user inputs information.

The timer 13g keeps track of the date and time.

The infrared transmission/reception section 14 exchanges information with the remote controller 1 via infrared light. That is, the infrared transmission/reception section 14 generates and transmits infrared light based on data that is supplied from the IF 13d, and also receives infrared light that has been transmitted from the remote controller 1, converts it into a corresponding electrical signal, and outputs it to the CPU 13a via the IF 13d.

Next, the operation of this embodiment will be described with reference to a flow chart of FIG. 7.

Figure 7:
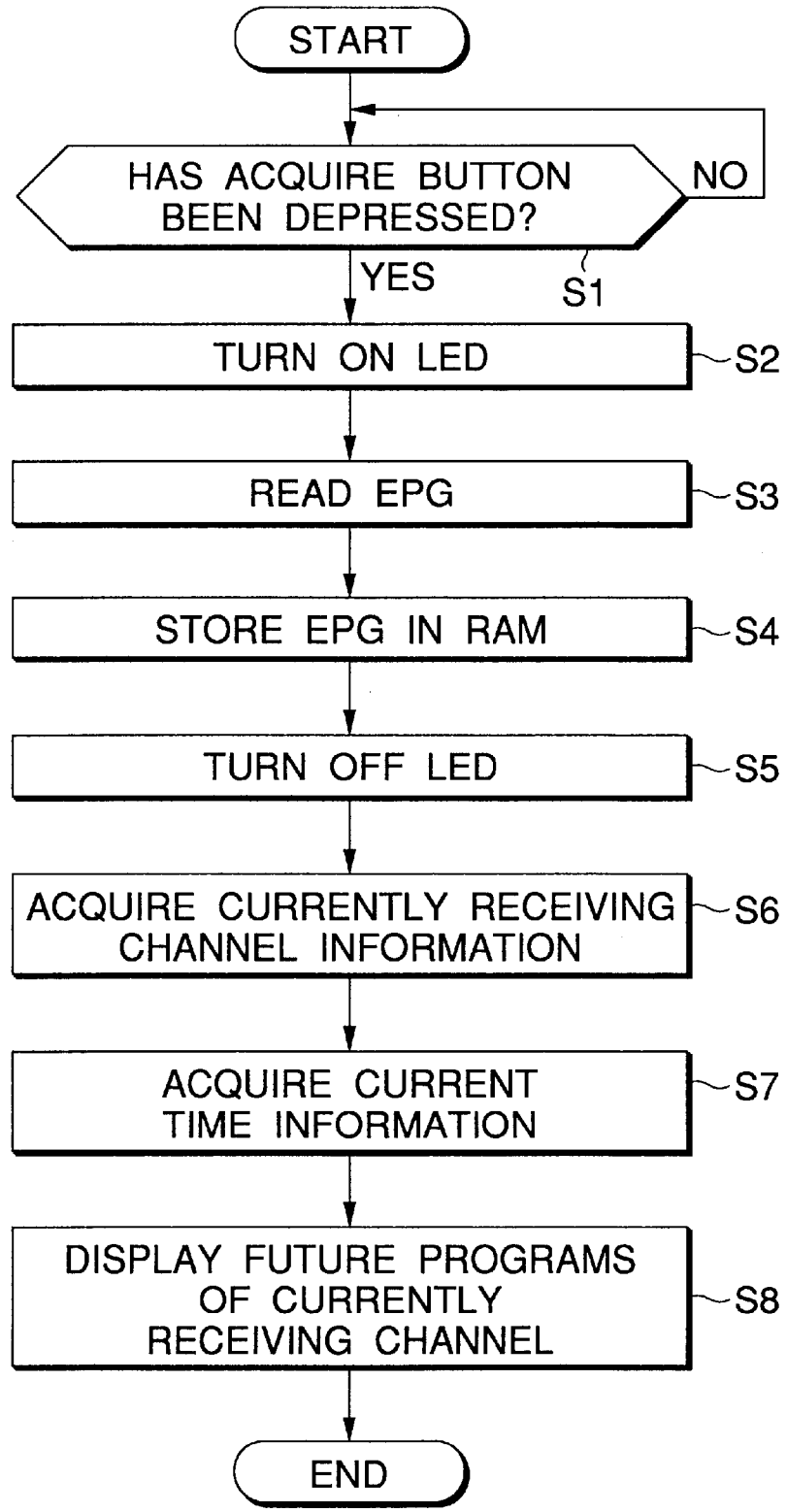
FIG. 7 is a flowchart showing an example of operation that is performed by the remote controller 1 of FIG. 3.

FIG. 7 is a flowchart showing an example of a process that is executed by the CPU 1a of the remote controller 1 in acquiring, with the remote controller 1, an EPG that has been transmitted from the antenna 12 of a broadcasting station and received by the television receiver 9.

Upon activation of this process, at step SI, the CPU 1a of the remote controller 1 judges whether the acquire button 103 has been depressed. If it is judged that the acquire button 103 has not been depressed (No), the process returns to step S1. This operation is repeated until depression of the acquire button 103. If it is judged that the acquire button 103 has been depressed (Yes), the process goes to step S2.

At step S2, the CPU 1a turns on the LED 100 to indicate that information is being transferred. The process then goes to step S3.

At step S3, the CPU 1a supplies a prescribed control signal to the infrared transmission/reception section 1e. As a result, the infrared transmission/reception section 1e generates an infrared signal corresponding to the control signal and transmits it to the television receiver 9. The television receiver 9 receives the transmitted infrared signal with the infrared transmission/reception section 10, and reproduces the control signal. The CPU 9a of the television receiver 9 temporarily stores, in the RAM 9c or the like, an EPG being received by the TV tuner 9e in accordance with the control signal that has been received by the infrared transmission/ reception section 10, and then transmits it to the remote controller 1 via the infrared transmission/reception section 10.

Figure 8:
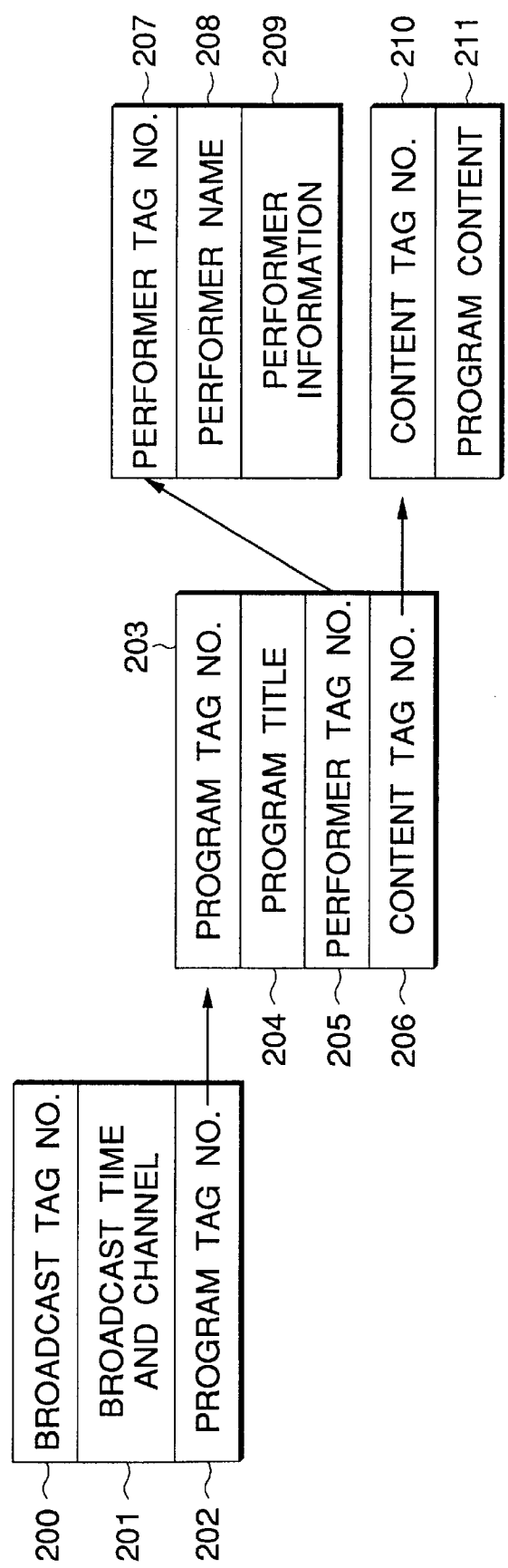
FIG. 8 shows a data structure of an EPG.

FIG. 8 shows an example of a data structure of an EPG. As shown in FIG. 8, an EPG is formed in such a manner that a plurality of (in this example, four) data blocks are linked to each other. The first block (leftmost block in FIG. 8) consists of a broadcast tag No. 200 indicating a broadcast number, data 201 indicating a broadcast time and channel, and a program tag No. 202 indicating a block that follows the first block.

The second block consists of a program tag No. 203 for a link to the first block, data 204 indicating a program title, a performer tag No. 205 indicating the third block, and a content tag No. 206 indicating the fourth block.

The third block (shown at a top-right position in FIG. 8) consists of a performer tag No. 207 for a link to the second block, data 208 indicating performer names, and data 209 indicating performer information.

The fourth block (shown at a bottom-right position in FIG. 8) consists of a content tag No. 210 for a link to the second block and data 211 indicating program contents.

For example, the above information is transmitted from a broadcasting station in a state that it is superimposed on a video signal in vertical flyback periods.

Returning to FIG. 7, at step S4, the CPU 1a of the remote controller 1 stores the received EPG in a prescribed area of the RAM 1c. When the entire EPG has been stored, the process goes to step S5.

At step S5, the CPU 1a turns off the LED 100 to indicate that the information transfer has finished. The process then goes to step S6.

At step S6, the CPU 1a recognizes a channel number of current reception. That is, the CPU 1a transmits a prescribed control signal from the infrared transmission/reception section 1e, and recognizes a channel number of current reception by referring to information indicating the same that is transmitted in response.

Instead of directly inquiring of the television receiver 9, a channel number of current reception may be recognized by referring to part of the numeral buttons 111–120 that was depressed immediately before for channel selection.

At step S7, the CPU 1a recognizes the present time by acquiring information indicating it from the timer 1g via the IF 1d. The process then goes to step S8.

At steep S8, the CPU 1a causes the LCD 1f to display an EPG of programs to be broadcast from this time onward on the channel of current reception. Specifically, the CPU 1a searches EPGs (guides for programs to be broadcast on the day on all channels) stored in the RAM 1c for data relating to program to be broadcast from this time onward on the channel of current reception by referring to the channel of current reception and the present time recognized at steps S6 and S7, and then causes the LCD lf to display the data obtained.

FIG. 9 shows an example of an EPG to be displayed on the LCD lf as a result of the above operation.

In this example, an EPG of programs to be broadcast from this time onward on channel 10. Specifically, the EPG shows that "ABB News" will be broadcast from 6:00 to 6:30 and "Be Disgraced in Quiz Show" will be broadcast from 6:30 to 7:00. The EPG also shows that "TV Scramble" will be broadcast from 7:00 to 8:00, "Monico Grand Prix" will be done from 8:00 to 9:00, "Creation of All Things" will be done from 9:00 to 10:00, "News Station Eyes" will be done from 10:00 to 11:30, and "Conductors in the World" will be done from 11:30 to 12:00.

The above embodiment makes it possible to acquire, with the remote controller 1, an EPG that has been received by the television receiver 9 and display it on the LCD 1f. Therefore, for example, even while the user watches some broadcast program on the television receiver 9, he can check programs to be broadcast from this time onward by using an EPG without obstructing the display of the television receiver 9.

Although in the above embodiment only an EPG relating to programs to be broadcast from this time onward on the channel of current reception is displayed, EPGs of all programs to be broadcast on all channels, for example, may be displayed. Further, a modification is possible which allows the user to select an EPG that he wants to display by a predetermined manipulation.

Next, with reference to a flowchart of FIG. 10, a description will be made of an example of a process for making a recording reservation on the VTR 13, by using the display example of FIG. 9.

Figure 10:
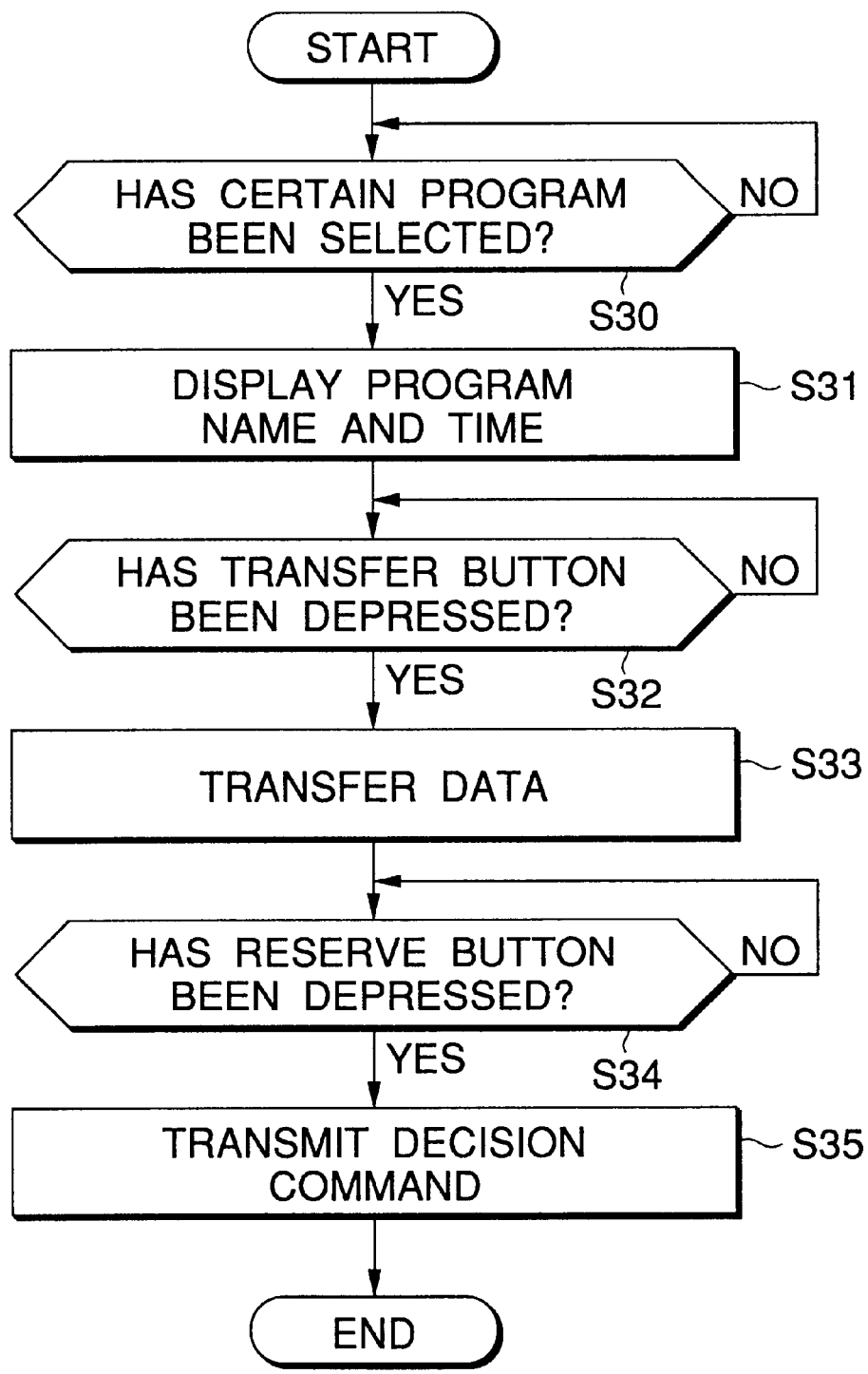
FIG. 10 is a flowchart of another example of operation that is performed by the remote controller 1 of FIG. 3.

FIG. 10 is a flowchart showing an example of a process of making a recording reservation on the VTR 13 by using the remote controller 1 that has acquired the EPG.

Upon activation of the process of FIG. 10, at step S30, the CPU 1a of the remote controller 1 judges whether some program has been selected on the display picture of FIG. 9. Specifically, the CPU 1a judges whether the L-button 110 for deciding about a selection has been depressed after the cruciform button 121 shown in FIG. 2 was manipulated and some program was selected by the cursor (not shown) on the display picture shown in FIG. 9. If the CPU 1a has judged that no program has been selected (No), the process returns to step S30 to repeat the above operation. If it is judged at step S30 that some program has been selected (Yes), the process goes to step S31.

Now, assume that the item "10:00–11:30 News Station Eyes" that is displayed on the sixth line on the display picture of FIG. 9 was selected by the cruciform button 121 and then the L-button 110 was depressed, a judgment "Yes" is made at step S30 and the process goes to step S31.

At step S31, the program title and the broadcast time are displayed. Specifically, the CPU 1a reads out, from the RAM 1c, the program title, start and end time, performers (in this case, anchor men), and contents and has those displayed on the LCD 1f.

FIG. 11 shows an example of a picture to be displayed when the program "10:00–11:30 News Station Eyes," which is shown on the sixth line on the display example of FIG. 9, is selected. In this display example, the title "News Station Eyes" of the selected program is shown at the top of the picture. The broadcast start time "10:00" and end time "11:30" are shown under the title. The names of anchor men "Tetsuya Kume" and "Etsuo Komiya" are shown thereunder. Further, program contents "Up-to-the-minute Reports of Election Returns," "Preventive Measures against 0158," and "Does Life Exist on Mars?" are shown thereunder.

Returning to FIG. 10, at step S32, the CPU 1a judges whether the transfer button 102 has been depressed. If it is judged that the transfer button 102 has not been depressed (No), the process returns to step S32 to repeat the same operation until depression of the transfer button 102. If it is judged that the transfer button 102 has been depressed (Yes), the process goes to step S33.

At step S33, the CPU 1a transmits a prescribed control signal as an instruction for a recording reservation and the information relating to the program selected at step S30, that is, the broadcast start and end time and the broadcast channel number, to the VTR 13 via the infrared transmission/reception section 1e. The CPU 13a of the VTR 13 captures, via the IF 13d, the signal received by the infrared transmission/reception section 14, and stores it in the RAM 13c.

Assume that the transfer button 102 is depressed at this time. A judgment of "Yes" is made at step S32, and the process goes to step S33. At step S33, a control command as an instruction for a recording reservation and the information (the broadcast start time and end time and the broadcast channel number) relating to the sixth program "News Station Eyes" that was designated on the picture of FIG. 9 are transmitted to the VRT 13.

At step S34, it is judged whether the reserve button 108 has been depressed. If the reserve button 108 has not been depressed (No), the process returns to step S34 to repeat the same operation until depression of the reserve button 108. If it is judged that the reserve button 108 has been depressed (YES), the process goes to step S35.

At step S35, the CPU 1a transmits a decision command for deciding about the recording reservation for which the instruction was made at step S33, to the VTR 13 via the infrared transmission/reception section 6. The CPU 13a of the VTR 13 receives this command via the infrared transmission/reception section 14, whereby the recording reservation relating to the information stored in the RAM 13c is finally set. When the time that is kept by the timer 13g becomes the broadcast start time that is stored in the RAM 13c, the CPU 13a sends a control signal to the VT recording/playback section 13e to start recording of the program whose broadcast channel number is stored in the RAM 13c. When the time that is kept by the timer 13g becomes the broadcast end time that is stored in the RAM 13c, the CPU 13a sends a control signal to the VT recording/playback section 13e to finish the recording of the program.

Assume that the reserve button 108 is depressed at this time. A judgment of "Yes" is made at step S34 and the process goes to step S35. At step S35, a decision command is transmitted from the remote controller 1 to the VTR 13, whereby a recording reservation of the program "News Station Eyes" for which the related information has been transmitted is finally set.

In the above embodiment, a desired program is selected from an EPG that has been acquired by the remote controller 1 and a recording reservation is made on the VTR 13 by using information relating to the program. Therefore, it becomes possible to eliminate the time and labor of inputting information such as a broadcast start time and end time and a broadcast channel number to the VTR 13 or the remote controller 1.

Although the above embodiment is directed to the case where an EPG is received by the remote controller 1, the invention is not limited to such a case. For example, advertisement information may be received by the remote controller 1. Such an embodiment will be described below with reference to a flowchart of FIG. 12.

Figure 12:
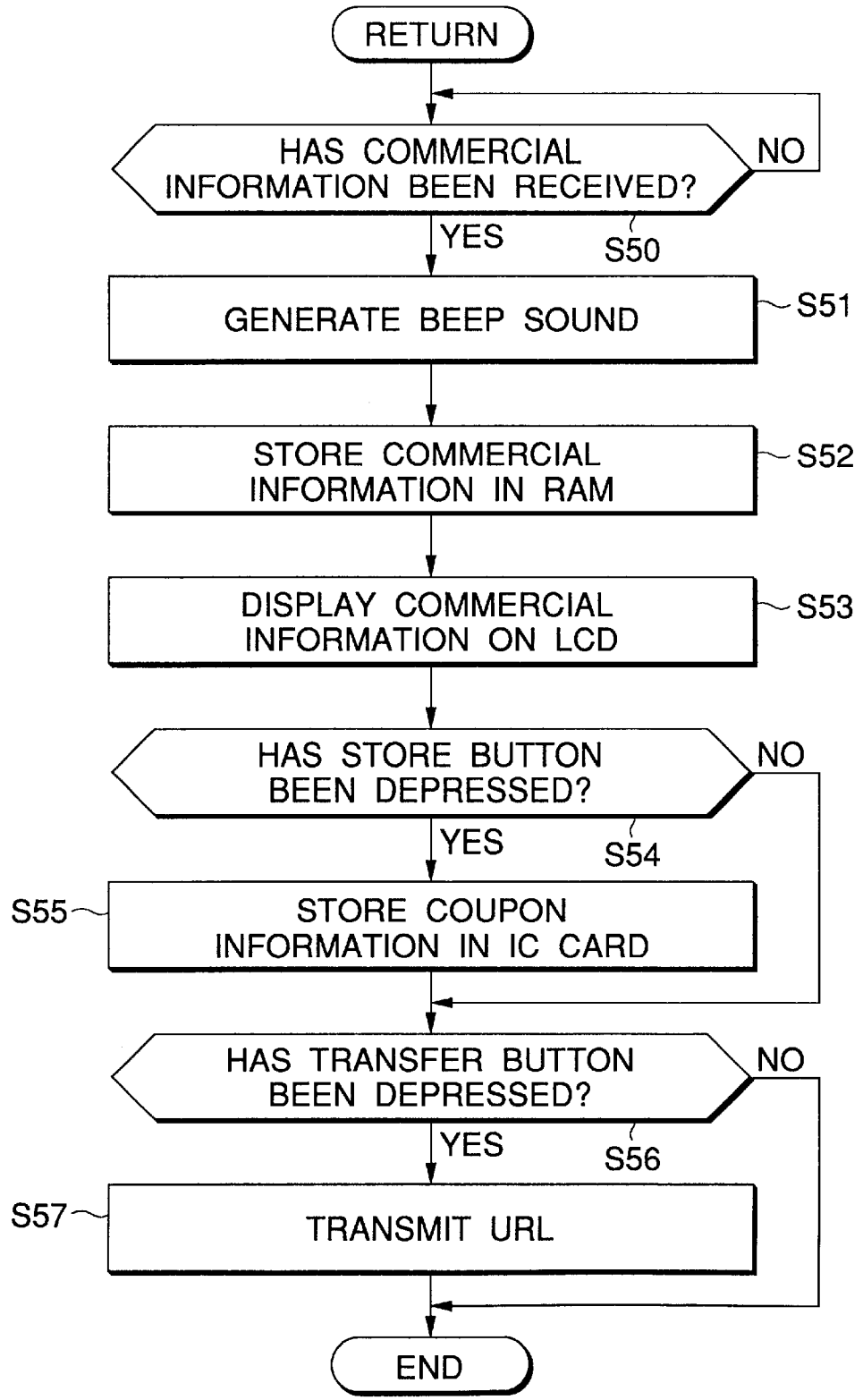
FIG. 12 is a flowchart of still another example of operation that is performed by the remote controller 1 of FIG. 3.

FIG. 12 is a flowchart showing an example of a process that is executed in the remote controller 1 when advertisement information that has been received by the television receiver 9 is transferred to the remote controller 1.

In this embodiment, the television receiver 9 is so configured as to extract advertisement information that is inserted, for instance, between programs and to automatically transmit it to the remote controller 1.

Upon activation of this process, at step S50, the CPU 1a of the remote controller 1 judges whether advertisement (commercial) information has been received from the television receiver 9. That is, when receiving commercial information in, for instance, a period between programs, the infrared transmission/reception section 10 automatically transmits it to the remote controller 1.

Examples of commercial information are information such as the product name, features, and price of a commodity, and the URL and coupon information of a company that manufactures or sells a commodity.

At step S51, beep sound indicating reception of commercial information is generated. That is, the CPU 1a sends a predetermined signal to the speaker 1j via the IF 1d, and beep sound is thereby generated. As a result, the user knows that commercial information has been received.

At step S52, the CPU 1a stores the commercial information that was received at step S50 in the RAM 1c. The process then goes to step S53.

At step S53, the CPU 1a reads out the commercial information that is stored in the RAM 1c and causes the LCD 1f to display it.

FIG. 13 shows an example of a picture that is displayed on the LCD 1f as a result of execution of step S53. In this example, it is shown at the top of the picture that this is a display of commercial information relating to TONY's digital still camera. A product name "DSC-100" of the commodity as a subject of advertisement is shown on the second line.

Features of the commodity are listed under the product name. In this example, "Business Card Size," "One Million Pixels," "Capable of Taking 1,000 Pictures at the Maximum," and "Also Capable of Recording Sound" are shown. The price of the product "¥39,800" is shown thereunder.

"Now, 10%-discount Is Available with Coupon!" is shown under the price, which means that this commercial information includes coupon information.

Commercial information may include coupon information as accompanying information. In such a case, the coupon information is transmitted from the television receiver 9 to the remote controller 1 together with the commercial information and then stored in the RAM 1c.

Returning to FIG. 13, a URL "www.tony.com" of the company that manufactures or sells this commodity is shown on the last line. Like coupon information, URL information of this kind is transmitted, as accompanying information, from the television receiver 9 to the remote controller 1 together with commercial information and then stored in the RAM 1c.

Returning to FIG. 12, at step S54, it is judged whether the store button 105, which is to be manipulated in storing coupon information that is included in commercial information in the IC card 2, has depressed. If it is judged that the store button 105 has not been depressed (No), the process goes to step S56 skipping step S55.

At step S55, the CPU 1a extracts the coupon information that is included in the commercial information and supplies it to the IC card recording/reproduction section 1i. The IC card recording/reproduction section 1i records the received coupon information in a prescribed area of the IC card 2. By bringing the IC card 2 on which the coupon information of the commodity is recorded to, for instance, a proper store, the commodity can be purchased at a lower price than the ordinary price.

At the next step S56, it is judged whether the transfer button 102 has been depressed. If it is judged that the transfer button 102 has not been depressed (No), the process skips step S57 and ends. If it is judged that the transfer button 102 has been depressed (Yes), the process goes to step S57.

Specifically, to access the homepage having as an address the URL that is shown at the last line of the picture of FIG. 13, the user manipulates the transfer button 102 after directing the remote controller 1 to the personal computer 3. As a result, a judgment of "Yes" is made at step S56 and the process goes to step S57.

At step S57, the CPU 1a reads out the URL included in the commercial information that is stored in the RAM 1c and supplies it to the infrared transmission/reception section 1e. The infrared transmission/reception section 1e converts the received URL into a corresponding infrared signal and transmits it.

The URL that has been transmitted in this manner is received by the infrared transmission/reception section 6 of the personal computer 3 and supplied to the CPU 3a. The CPU 3a transmits the URL to the network 7 via the modem section 3d (second receiving means). As a result, a communication circuit is established with a server 8 corresponding to the transmitted URL and allows a communication between the personal computer 3 and the server 8.

Figure 14:
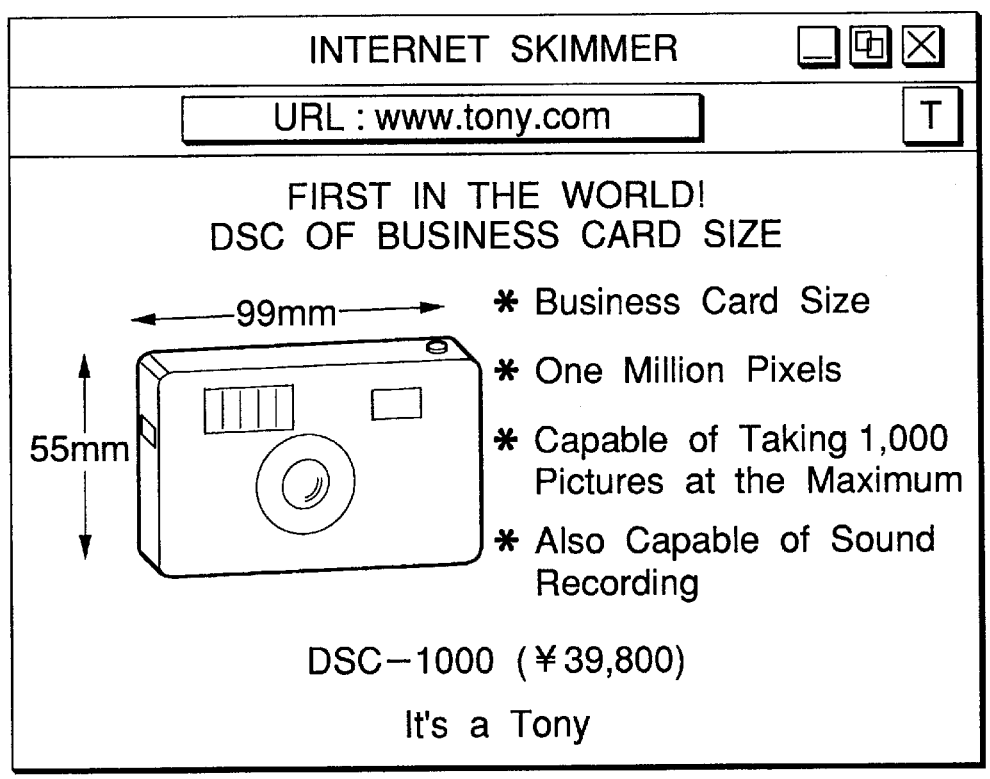
FIG. 14 shows an example of a picture that is displayed on a CRT monitor 4 of the personal computer 3 as a result of execution of step S57 shown in FIG. 12.

FIG. 14 shows an example of a picture that is displayed on the CRT monitor 4 of the personal computer 3 when step S57 is executed.

In this display example, "Internet Skimmer" that is the name of software used (for information exchange via the network 7) is shown at the top of the picture. The URL "www.tony.com" that has been transferred from the remote controller 1 at step S57 is shown in the frame located under the software name.

An image that has been transmitted from the server 8 after the establishment of the communication circuit is shown in the window that is shown under the above-mentioned frame. In this display example, a catch phrase, features, the name, the price, an image, etc. of the product DSC-100 for which display is made on the LCD if of the remote controller 1 are displayed.

The process of the CPU 1a ends when step S57 is completed.

In the above embodiment, commercial information that is included in broadcast waves received by the television receiver 9 is automatically transmitted to the remote controller 1. Therefore, when the user is interested in information that has been received by the remote controller 1, he can refer to it later without haste. Further, by accessing the homepage of the seller or manufacturer of the commodity by using the personal computer 3, more detailed information of the commodity can be obtained. Still further, as for purchasing of the commodity, coupon information may be stored in the IC card 2 by depressing the store button 106. By bringing the IC card 2 to, for instance, a proper store, the commodity can be purchased at a lower price than the ordinary price.

Although in the above embodiment the television receiver 9 automatically transmits commercial information, the invention is not limited to such a case. For example, the television receiver 9 may transfer commercial information only when receiving a transfer request from the remote controller 1.

Another embodiment is possible in which commercial information is classified into a plurality of categories and commercial information to which information indicating its category is added is transmitted. In this embodiment, a category that is frequently referred to by the user (i.e., a category that is considered to attract his interest) may be stored in the RAM 1c, and commercial information may be received and stored only when its category is the same as the category stored in the RAM 1c.

Although the above embodiments are directed to the case of analog ground-wave broadcast, the invention is not limited to such a case. For example, it goes without saying that the invention can also be applied to satellite broadcast, digital broadcast, cable television broadcast, and the like.

Although in the above embodiments a communication is made between the remote controller 1 and the personal computer 3, the television receiver 9, or the VTR 13, a data communication may be made between the personal computer 3, the television receiver 9, and the VTR 13. For example, it is possible to make a recording reservation by converting, into an infrared signal, an EPG described in a homepage that is accessed by the personal computer 3 and then transmitting it to the VTR 13, for instance.

Further, the invention can even be applied to current electric apparatuses by making commands that are transmitted from or received by the remote controller correspond to SIRCS commands of respective makers.

In this specification, the term "transmission medium" includes not only information recording media such as a FD and a CD-ROM but also network transmission media such as the Internet and a digital broadcast satellite.

What is claimed is:

1. An electric apparatus system comprising an electric apparatus which receives information that is transmitted via a transmission medium and a control device which controls the electric apparatus by transmitting a control signal to the electric apparatus, the electric apparatus comprising:

first receiving means for receiving the control signal transmitted from the control device;

control means for performing a control in accordance with the control signal received by the first receiving means;

second receiving means for receiving the information transmitted via the transmission medium;

extracting means for extracting additional information from the information received by the second receiving means; and first transmitting means for transmitting the additional information extracted by the extracting means to the control device, the control device comprising:

second transmitting means for transmitting the control signal to the electric apparatus;

third receiving means for receiving the additional information transmitted from the first transmitting means of the electric apparatus; and output means for outputting the additional information received by the third receiving means to a display device.

2. A control method of an electric apparatus system comprising an electric apparatus which receives information that is transmitted via a transmission medium and a control device which controls the electric apparatus by transmitting a control signal to the electric apparatus, an electric-apparatus-side part of the control method comprising the steps of:

a first receiving step of receiving the control signal transmitted from the control device;

performing a control in accordance with the control signal received in the first receiving step;

a second receiving step of receiving the information transmitted via the transmission medium;

extracting additional information from the information received in the second receiving step; and a first transmitting step of transmitting the additional information extracted in the extracting step to the control device, a control-device-side part of the control method comprising:

a second transmitting step of transmitting the control signal to the electric apparatus;

a third receiving step of receiving the additional information transmitted in the first transmitting step of the electric-apparatus-part of the control method; and outputting the additional information received in the third receiving step to a display device.

3. A transmission medium for transmitting a computer program used in an electric apparatus system comprising an electric apparatus which receives information that is transmitted via a transmission medium and a control device which controls the electric apparatus by transmitting a control signal to the electric apparatus, an electric-apparatus-side part of the computer program comprising the steps of:

a first receiving step of receiving the control signal transmitted from the control device;

performing a control in accordance with the control signal received in the first receiving step;

a second receiving step of receiving the information transmitted via the transmission medium;

extracting additional information from the information received in the second receiving step; and a first transmitting step of transmitting the additional information extracted in the extracting step to the control device, a control-device-side part of the computer program comprising:

a second transmitting step of transmitting the control signal to the electric apparatus;

a third receiving step of receiving the additional information transmitted in the first transmitting step of the electric-apparatus-part of the control method; and outputting the additional information received in the third receiving step to a display device.

4. A control method of an electric apparatus system, comprising the steps of:

storing a computer program transmitted from a transmission medium, the transmission medium for transmitting said computer program used in an electric apparatus system comprising an electric apparatus which receives information that is transmitted via said transmission medium and a control device which control the electric apparatus by transmitting a control signal to the electric apparatus, an electric-apparatus-side part of the computer program including the steps of:

a first receiving step of receiving the control signal transmitted from the control device;

performing a control in accordance with the control signal received in the first receiving step;

a second receiving step of receiving the information transmitted via the transmission medium;

extracting additional information from the information received in the second receiving step; and a first transmitting step of transmitting the additional information extracted in the extracting step to the control device, a control-device-side part of the computer program including the steps of:

a second transmitting step of transmitting the control signal to the electric apparatus;

a third receiving step of receiving the additional information transmitted in the first transmitting step of the electric-apparatus-part of the control method;

outputting the additional information received in the third receiving step to a display device; and controlling the electric apparatus system by using the computer program.

* * * * *

UNITED STATES PATENT AND TRADEMARK OFFICE
CERTIFICATE OF CORRECTION

PATENT NO.   : 6,246,441 B1
DATED        : June 12, 2001
INVENTOR(S)  : Terakado et al.

It is certified that error appears in the above-identified patent and that said Letters Patent is hereby corrected as shown below:

Column 4,
Line 62, change "If" to -- 1f --;
Line 66, change "if" to -- 1f --.

Column 5,
Line 4, change "if" to -- 1f --;
Line 61, change "A" to -- An --.

Column 6,
Line 49, change "if" to -- 1f --;
Line 53, in first occurrence, delete "is".

Column 8,
Line 24, change "SI" to -- S1 --.

Column 13,
Line 17, change "if" to -- 1f --;

Signed and Sealed this

Twenty-sixth Day of March, 2002

Attest:

Attesting Officer

JAMES E. ROGAN
*Director of the United States Patent and Trademark Office*